United States Patent
Duckett et al.

(10) Patent No.: US 9,684,522 B2
(45) Date of Patent: Jun. 20, 2017

(54) CUSTOMIZABLE FOOD FRESHNESS PRINTER STARTUP WIZARD

(71) Applicant: Avery Dennison Retail Information Services, LLC, Mentor, OH (US)

(72) Inventors: Jeanne F. Duckett, Franklin, OH (US); Mark S. Morrow, Kettering, OH (US); Gary E. McMullen, Springsboro, OH (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/873,746

(22) Filed: Oct. 2, 2015

(65) Prior Publication Data
US 2016/0098282 A1 Apr. 7, 2016

Related U.S. Application Data

(60) Provisional application No. 62/059,474, filed on Oct. 3, 2014.

(51) Int. Cl.
*G06F 9/44* (2006.01)
*H04N 1/00* (2006.01)
(Continued)

(52) U.S. Cl.
CPC .......... *G06F 9/4446* (2013.01); *G06F 3/1204* (2013.01); *G06F 8/61* (2013.01);
(Continued)

(58) Field of Classification Search
CPC ........ G06F 9/4446; G06F 8/61; G06F 3/1204; G06K 15/021; G06K 15/028;
(Continued)

(56) References Cited

U.S. PATENT DOCUMENTS 7,253,915 B2 * 8/2007 Kemp .................. G06F 3/1204 358/1.15
7,917,604 B1 * 3/2011 Gruttadauria ..... G06F 17/30873 707/762
(Continued)

FOREIGN PATENT DOCUMENTS

WO 01/16890 A2 3/2001

OTHER PUBLICATIONS

International Search Report and Written Opinion, prepared for PCT/US2015/053749, dated Jan. 4, 2016.

*Primary Examiner* — Allen H Nguyen
(74) *Attorney, Agent, or Firm* — Avery Dennison Retail Information Services, LLC

(57) ABSTRACT

A method of utilizing a startup wizard is disclosed. The startup wizard guides a user through the installation of a food freshness barcode printer, enabling a non-technical user to complete the installation in minimal time. Specifically, the startup wizard detects first power on or is accessible from a system menu. Then, when the printer is installed, the startup wizard is entered which prompts the user for some or all of the following items: language, date format, product database, network configuration, or other specific elements required for implementation. The user is then guided through the installation process which enables a non-technical user to complete the installation of the food freshness barcode printer in minimal time.

21 Claims, 4 Drawing Sheets

(51) Int. Cl.
  *G06K 15/02* (2006.01)
  *G06F 9/445* (2006.01)
  *G06F 3/12* (2006.01)
  *G06Q 10/10* (2012.01)
  *G06Q 30/06* (2012.01)

(52) U.S. Cl.
  CPC ......... *G06K 15/021* (2013.01); *G06K 15/028* (2013.01); *G06Q 10/103* (2013.01); *G06Q 30/0621* (2013.01); *H04N 1/00352* (2013.01); *H04N 1/00408* (2013.01); *H04N 1/00498* (2013.01)

(58) Field of Classification Search
  CPC ........... H04N 1/00408; H04N 1/00498; H04N 1/00352; G06Q 10/103
  USPC ....................................................... 358/1.15
  See application file for complete search history.

(56) References Cited

U.S. PATENT DOCUMENTS

| | | | |
|---|---|---|---|
| 2003/0069915 A1* | 4/2003 | Clough | G06F 9/4411 718/100 |
| 2003/0236871 A1* | 12/2003 | Thurlow | G06F 9/4411 709/223 |
| 2004/0193745 A1 | 9/2004 | Olbricht | |
| 2004/0255270 A1* | 12/2004 | McGlinchey | G06F 9/4446 717/109 |
| 2006/0106918 A1* | 5/2006 | Evert | H04L 63/20 709/220 |
| 2007/0226071 A1* | 9/2007 | Kern | G06Q 10/087 705/26.5 |
| 2008/0005104 A1* | 1/2008 | Flake | G06F 17/3087 |
| 2011/0217106 A1* | 9/2011 | Shimomura | B41J 11/44 400/76 |
| 2012/0036552 A1* | 2/2012 | Dare | H04L 41/0253 726/1 |

* cited by examiner

CUSTOMIZABLE FOOD FRESHNESS PRINTER STARTUP WIZARD

CROSS-REFERENCED TO RELATED APPLICATION(S)

The present application claims priority from U.S. Provisional Application No. 62/059,474 filed Oct. 3, 2014 which is incorporated by herein by reference in its entirety.

BACKGROUND

The present invention relates generally to food freshness barcode printers that are installed in food service centers where non-technical users are required to complete the installation in minimal time. More particularly, the present disclosure relates to a method of utilizing a startup wizard that guides a user through the installation on a food freshness barcode printer, enabling the non-technical user to complete the installation in minimal time.

A barcode printer is a computer peripheral or a smart device for printing barcode labels or tags that can be attached to, or printed directly on, physical objects. Barcode printers are commonly used to label cartons before shipment, or to label retail items with UPCs or EANs. The most common barcode printers employ one of two different printing technologies. Direct thermal printers use a print head to generate heat that causes a chemical reaction in specially designed paper that turns the paper black. Thermal transfer printers also use heat, but instead of reacting the paper, the heat melts a waxy or resin substance on a ribbon that runs over the label or tag material. The heat transfers ink from the ribbon to the paper.

Barcode printers are designed for different markets. Industrial barcode printers are used in large warehouses, manufacturing facilities, and food facilities. They have large paper capacities, operate faster and have a longer service life. However, installation and configuration of industrial barcode printers can be difficult and non-customizable. For retail and office environments, desktop barcode printers are most common. These desktop barcode printers can also be difficult to install and configure.

Furthermore, traditional setup and installation of food freshness barcode printers may conditionally utilize the use of a printed overlay to identify essential configurations. However, this approach is non-customizable and language centric. Further, the printer device may be a smart printer that may have an installed application to create custom functionality for the end user. If that is the case, then it is also undesirable to identify non-relevant configuration items to the user. Additionally, the food freshness printers are installed in food service centers where non-technical users are required to complete the installation in minimal time.

Thus, there exists a need for a method of utilizing a startup wizard that guides a user through the installation on a food freshness barcode printer, enabling the non-technical user to complete the installation in minimal time. There is also a need for a customizable installation that is not language centric.

The present invention discloses a startup wizard that prompts a user for some or all of the following items: language, date format, product database, network configuration, or other specific elements required for implementation. Further, the startup wizard detects first power on or is accessible from a system menu.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of utilizing a startup wizard that guides a user through the installation on a food freshness barcode printer, enabling the non-technical user to complete the installation in minimal time. Specifically, the startup wizard detects first power on and prompts a user for specific elements required for implementation.

In a preferred embodiment, the user is then stepped through the installation process which enables a non-technical user to complete the installation of the food freshness barcode printer in minimal time. The startup wizard detects first power on or is accessible from a system menu. Then, when the printer is installed, the startup wizard is entered which prompts the user for some or all of the following items: language, date format, product database, network configuration, or other specific elements required for implementation.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

Figure 1:
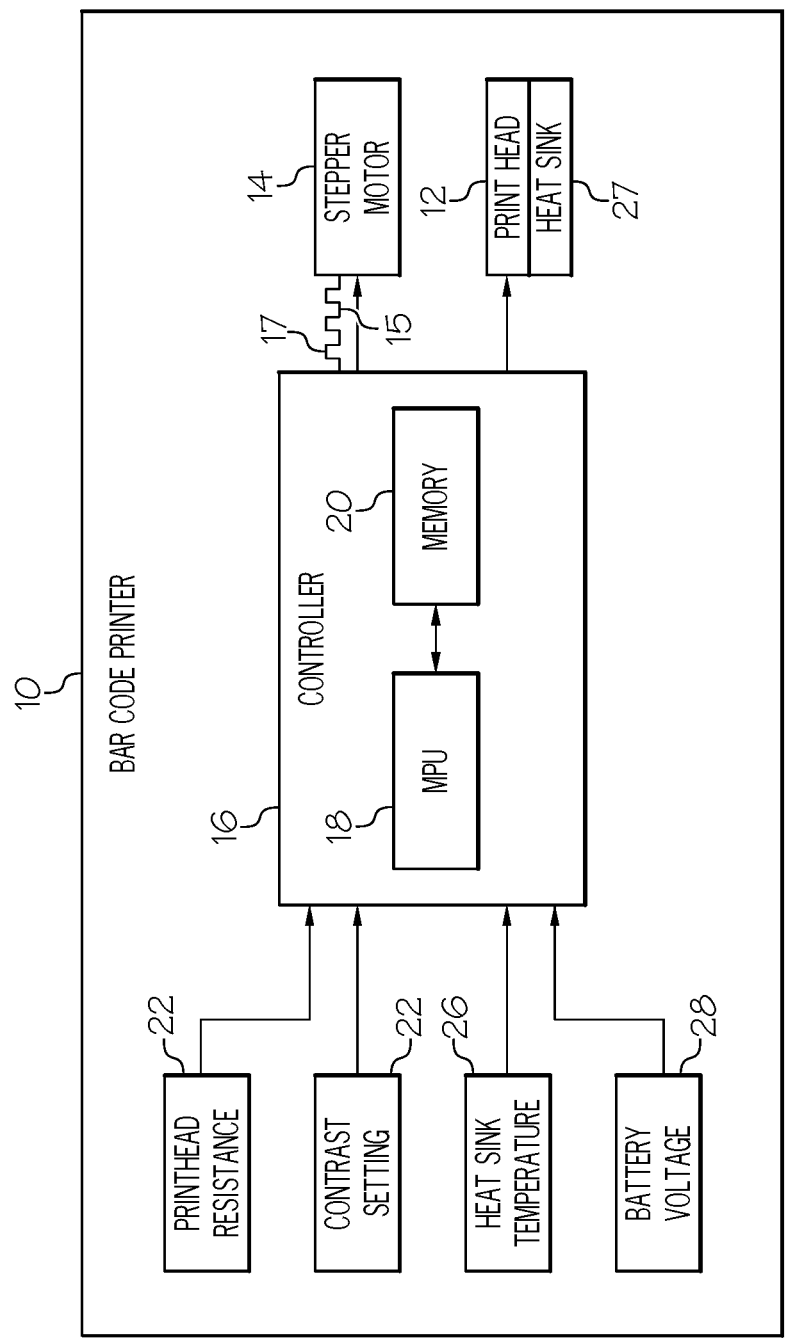
FIG. 1 illustrates a block diagram of a bar code printer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a method of utilizing a startup wizard where the startup wizard guides a user through the installation of a food freshness barcode printer, enabling a non-technical user to complete the installation in minimal time. Specifically, the startup wizard detects first power on or is accessible from a system menu. Then, when the printer is installed, the startup wizard is entered which prompts the user for some or all of the following items: language, date format, product database, network configuration, or other specific elements required for implementation.

Referring initially to the drawings, FIG. 1 illustrates a bar code printer 10 in accordance with the present invention, however any suitable bar code printer can be used as is known in the art. The bar code printer 10 comprises a thermal print head 12 for printing barcodes and alphanumeric information on a web of record members such as tags, labels or the like. The supply of the web of record members may be of the direct printing type such that the record members include paper coated with a thermally responsive material. Alternatively, the supply used with the bar code printer 10 may be of the transfer type wherein a carbon ribbon is heat activated by the print head 12 so as to print on the record members. The print head 12 is strobed to control the amount of energy applied thereto for printing. More particularly, current is applied to the print head 12 during a strobe time in order to print one line on a record member.

The bar code printer 10 also includes a stepper motor 14 or the like that is responsive to a periodic drive signal 15, the period 17 of which is defined by the time between the leading edges of consecutive or adjacent pulses of the drive signal. The stepper motor 14 is responsive to the drive signal 15 to advance the web of record members past the print head 12 for printing. The drive signal 15 controls the speed of the stepper motor 14 which in turn controls the print speed of the bar code printer 10.

A controller 16 includes a microprocessor 18 or the like which operates in accordance with software routines stored in a memory 20 so as to control the operations of the bar code printer 10. The software of the present invention is typically customizable per a customer's request which allows the software to be easily tailored around a customer's requirements. This prevents the need to rewrite the startup wizard with each and every customer, thus making a more efficient printer. In order to accomplish the ability to customize the software, a configuration file is created where the individual steps of the printer can be enabled or disabled. For example, a customer may decide they want the printer to only utilize English language commands. In such a situation, the customer may preset the machine to English and set the configuration flag to skip the language request step in the Setup Wizard. However, the software utilized by the printer of the present invention is not required to be customizable for the printer to function. A number of sensors, monitors, detectors or the like such as depicted at 22, 24, 26, and 28, monitor operating conditions of the bar code printer 10 including the resistance of the print head 12, the contrast setting of the barcode printer, the temperature of a heat sink 27 on which the print head 12 is mounted and the voltage of a battery powering the bar code printer 10. The measured values of the print head resistance, contrast setting, heat sink temperature, battery voltage, as well as other operating variables if desired, are utilized by the microprocessor 18 when implementing print speed control.

Figure 2A:
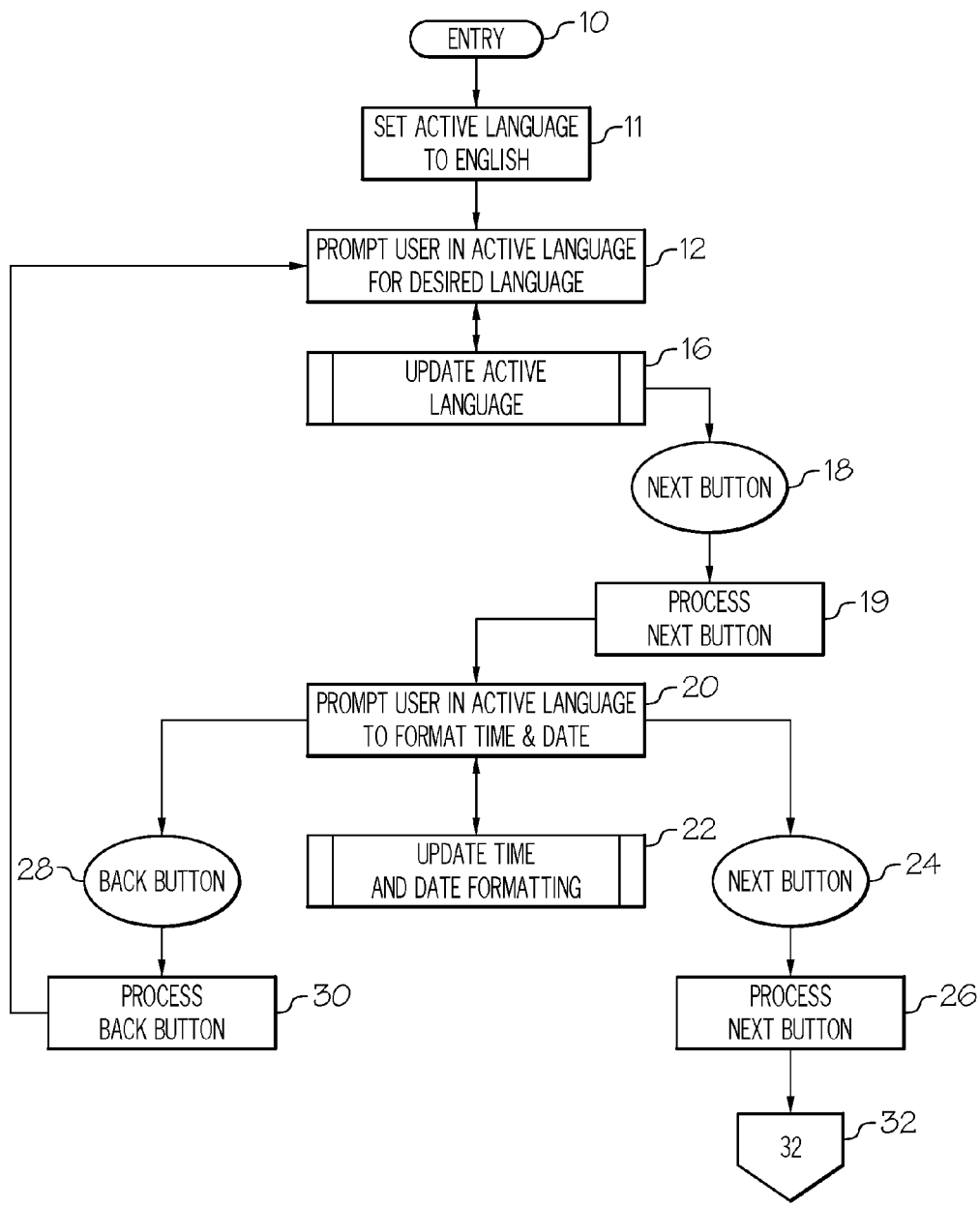
FIG. 2A illustrates a flowchart of the printer startup wizard process in accordance with the disclosed architecture.
Figure 2B:
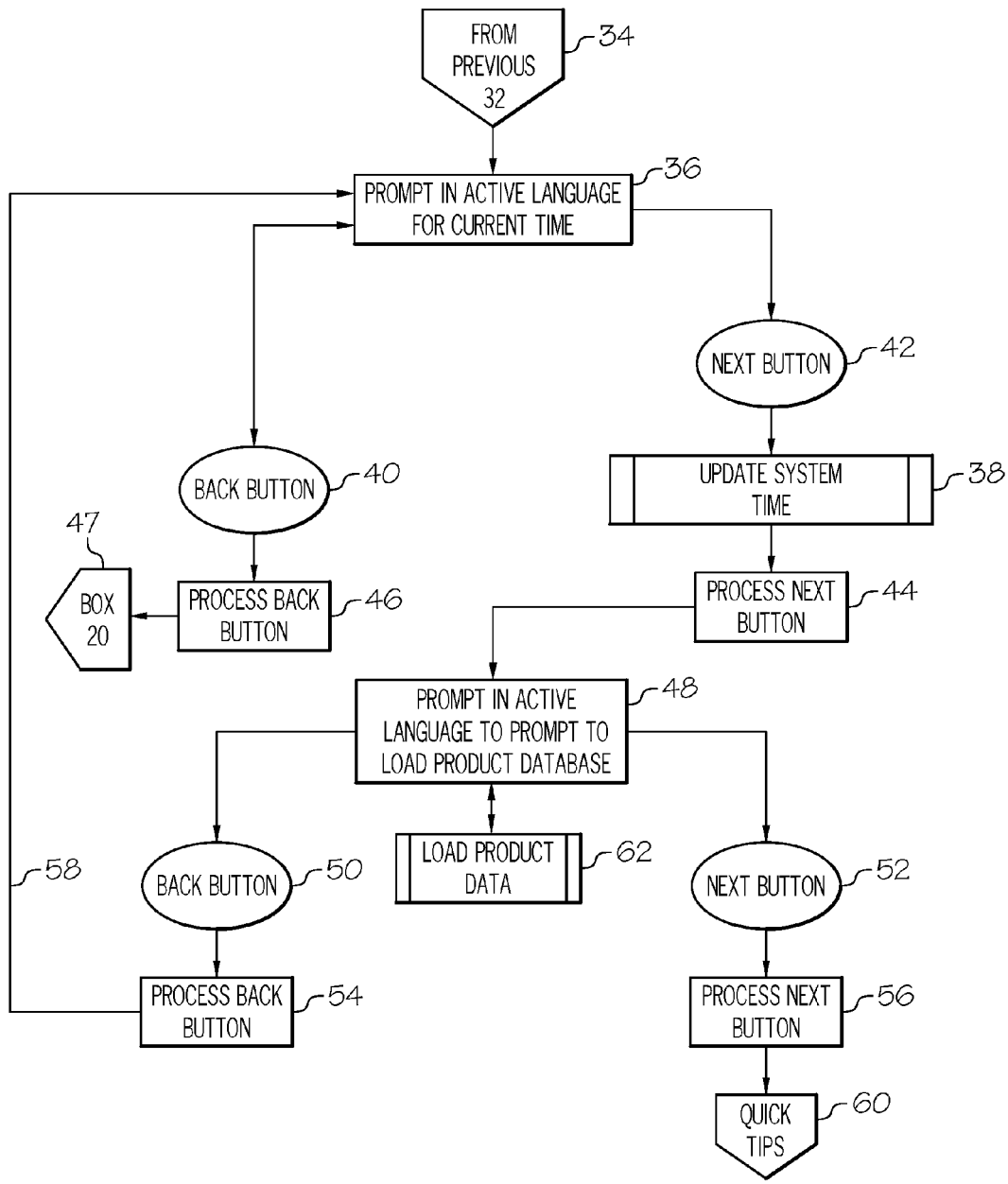
FIG. 2B illustrates a flowchart of the date/time and load user product data configurations in accordance with the disclosed architecture.
Figure 2C:
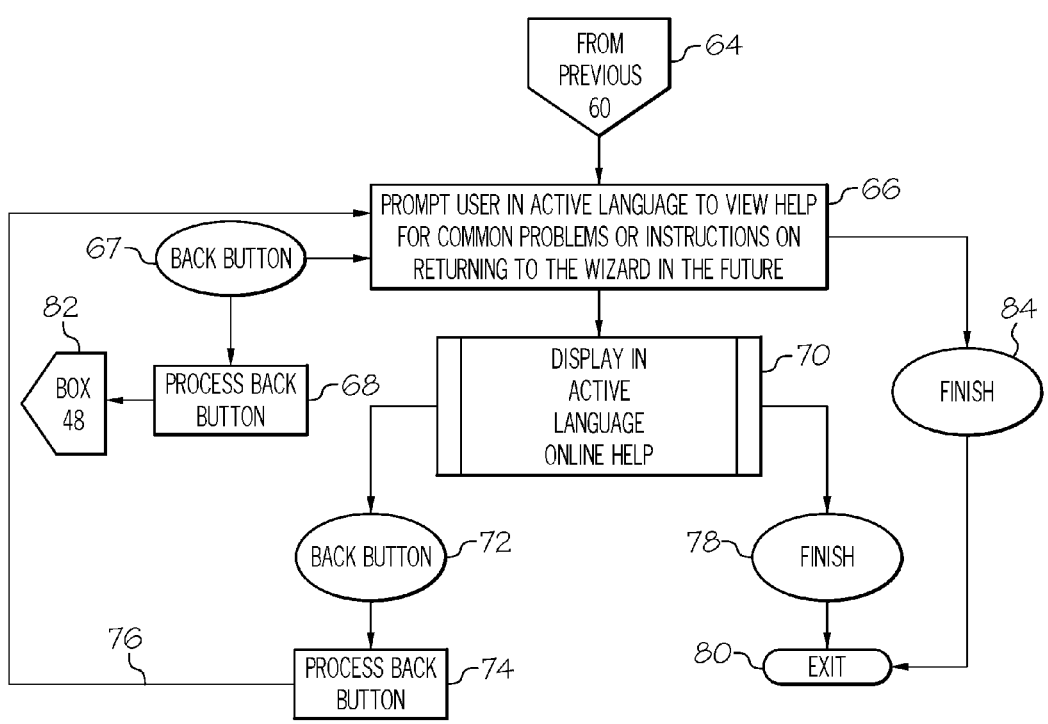
FIG. 2C illustrates a flowchart of the quick tips configuration in accordance with the disclosed architecture.

Generally referring to FIGS. 2A-C, the disclosed food freshness barcode printer, or any other suitable barcode printer comprises a printer startup wizard where the user is then stepped through the installation which enables a non-technical user to complete the printer installation in minimal time (i.e. in less than 1 minute).

During installation of the printer, the wizard prompts a user for some or all of the following items: type of language, data format, product database, network configuration, or other specific elements required for implementation. For example as shown in FIG. 2A, at printer startup, entry point 10 is where the printer powers on to find a first power flag set to true, or a menu was entered from a system configuration menu. At 12, the display language setting prompt drops down in the active language of the printer where the user can then select a new language at 12, if the active language is not appropriate. If a new language is not selected, then the user goes to the next button 18 for the next configuration selection. If a new language is chosen at 12, the menu (and setting prompts) are re-displayed in the selected language, and the active language of the printer is then updated (16). When the user selects the next button (18) the wizard proceeds to the next configuration selection. Then at 19 the next configuration item is determined from a configuration file. The present invention contemplates the utilization of a configuration file in order to quickly modify the behavior of the setup wizard on a customer-by-customer basis allowing which allows for the bypass of any configuration steps not desired by the end user.

Then at 20, the user is prompted in the active language of the printer to format the time and date. However, if a user needs to go back and change a configuration item selection, then at 28 the user chooses the back button selection to go back (see 10) and return to a back configuration item selection. Then at 30, the back button process determines the previous configuration item from a configuration file. If the user has completed the desired formatting or, if the date and time format is not updated, then the user proceeds to the next button 24 for the next configuration selection. Then at 26, the next configuration item from the configuration file is determined. As shown in FIG. 2B, the process continues at 34. At 36 the current time prompt is displayed in the selected language. At 36 the user can select the current time system time. Then, if the user needs to go back to a previous configuration item selection, the back button at 40 can be selected. At 46, the previous configuration item is determined from the configuration file. Then at 47, the process returns to the format time and data prompt 20 (the previous configuration item). If the user wants to move forward after updating the system time, then at 42 the user moves to the next button for the next configuration item selection. Then at 38 the system time is updated. Then at 44, the next button is processed to determine the next configuration item from the configuration file. At 48, the user is prompted in the active language to load product information in the data base.

If the user wants to go back to a previous configuration item selection, then at 50 the user is directed to the back button. Then at 54, the previous configuration item is determined from the configuration file (see 20). At 58, the user goes back to the update system time field 36 <CHANGED> (a previous configuration item selection). If a user wants to load product information into the data base, then the process progresses to 62 and the user can load their product information into the data base. If the user does not want to load product information into the data base, then the process progresses to 52, wherein the next button allows the next configuration item to be selected. Then at 56, the next configuration item is determined from the configuration file.

As shown in FIG. 2C, at 60, the process continues to the Quick Tips (or help) page. The process continues at 64, and then at 66 the user is prompted to view a help page for common problems which is displayed in the active language of the printer. At 70, the user chooses to display a selected help pages. If the user wants to go back to a previous configuration item selection, then at 72 the back button is selected. At 74, the process then moves to the process back button to determine the previous configuration item selected from the configuration file. At 76, the process returns to the previous configuration, 66. If the user is done selecting quick tips to display, then at 78 the user selects the finish button to terminate the wizard. If the user wants to go back to a previous configuration item selection, then at 67 the user is directed to the back button. Then at 68, the previous configuration item is determined from the configuration file (82). If the user does not want to view online help, then the process progresses to 84, to the finish button to terminate the wizard. At 80, the process is complete and the user is exited from the wizard.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A process for utilizing a printer startup wizard for a food fresh barcode printer, comprising the steps of:
   powering the printer on to find a first power flag set to true or entering a menu from a system configuration menu;
   dropping down the display language setting prompt in the active language of the printer;
   selecting a new language if needed;
   proceeding to a next configuration selection;
   prompting a user to format time and date;
   displaying a current time prompt in the selected language;
   updating system time;
   prompting the user to load product information in a data base;
   determining next configuration item from a configuration file;
   prompting a user to view a help page for common problems;
   after selecting a help tip to display, then selecting a finish button to terminate the startup wizard; and
   exiting program.

2. The process of claim 1, wherein the food fresh printer is a bar code printer.

3. The process of claim 1, wherein the startup wizard either detects first power on or is accessible from a system menu.

4. The process of claim 3, wherein when the startup wizard is entered, the startup wizard prompts the user for some or all of the following items: language, date format, time zone, product database, network configuration, or other specific elements required for implementation.

5. The process of claim 4, wherein the user is a non-technical user.

6. The process of claim 5, wherein the startup wizard enables a non-technical user to complete the installation of the food freshness barcode printer in minimal time.

7. The process of claim 6, wherein
   the non-technical user is prompted for some or all of the following items: language, date format, product database, network configuration, or other specific elements required for implementation and
   the non-technical user is guided through installation process; and
   wherein the startup wizard enables a non-technical user to complete the installation of the food freshness barcode printer in minimal time.

8. The process of claim 7, wherein the startup wizard either detects first power on or is accessible from a system menu.

9. The process of claim 7, wherein a configuration file drives the startup wizard.

10. The process of claim 9, wherein if the user wants to go back to a previous configuration item selection from the view help page configuration, then the user selects the back button.

11. The process of claim 1, wherein if a new language is chosen, the menu and setting prompts are re-displayed in the selected language, and the active language of the printer is then updated.

12. The process of claim 11, wherein if a new language is not selected, then the user proceeds to a next button for a next configuration selection.

13. The process of claim 1, wherein if a user needs to go back from the format time and date configuration item, and change a configuration item selection, then the user chooses a back button selection to go back and return to a back configuration item selection.

14. The process of claim 13, wherein if the date and time display is not updated, then the user proceeds to the next button for the next configuration item selection.

15. The process of claim 14, wherein if the date and time display needs to be updated, the menu for updating the date and time display is shown in the active language of the printer.

16. The process of claim 1, wherein if the user needs to go back to a previous configuration item selection from the update system time configuration item, the back button is selected and a previous configuration item is determined from a configuration file.

17. The process of claim 16, wherein if the user wants to move forward after updating the time, then the user moves to a next button for the next configuration item selection.

18. The process of claim 1, wherein if the user wants to go back to a previous configuration item selection from the load product information configuration item, then the user is directed to the back button.

19. The process of claim 18, wherein if a user wants to load product information into the data base, then the user loads their product information into the data base.

20. The process of claim 19, wherein if the user does not want to load product information into the data base, then the user proceeds to a next button which allows the next configuration item to be selected.

21. A process for utilizing a printer startup wizard for a barcode printer for use in a consumer application, comprising the steps of:
   powering the printer on to find a first power flag set to true or entering a menu from a system configuration menu;
   dropping down the display language setting prompt in the active language of the printer;
   selecting a new language if needed;
   proceeding to a next configuration selection;
   prompting a user to format time and date;
   displaying a current time prompt in the selected language;

updating system time;
prompting the user to load product information in a data base;
determining next configuration item from a configuration file;
prompting a user to view a help page for common problems;
after selecting a help tip to display, then selecting a finish button to terminate the startup wizard; and
exiting program.

* * * * *